(12) United States Patent
Lee et al.

(10) Patent No.: US 12,504,178 B2
(45) Date of Patent: Dec. 23, 2025

(54) COOKING DEVICE

(71) Applicant: SAMSUNG ELECTRONICS CO LTD., Suwon-si (KR)

(72) Inventors: Sangjin Lee, Suwon-si (KR);
Myoungkeun Kwon, Suwon-si (KR);
Sangjin Kim, Suwon-si (KR);
Changhoon Oh, Suwon-si (KR);
Qasim Khan, Suwon-si (KR);
Eungryeol Seo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 422 days.

(21) Appl. No.: 18/155,057

(22) Filed: Jan. 16, 2023

(65) Prior Publication Data

US 2023/0151971 A1 May 18, 2023

Related U.S. Application Data

(63) Continuation of application No. PCT/KR2021/003637, filed on Mar. 24, 2021.

(30) Foreign Application Priority Data

Jul. 15, 2020 (KR) ........................ 10-2020-0087765

(51) Int. Cl.
*F24C 15/20* (2006.01)
*F24C 15/10* (2006.01)

(52) U.S. Cl.
CPC ........ *F24C 15/2028* (2013.01); *F24C 15/102* (2013.01); *F24C 15/2042* (2013.01)

(58) Field of Classification Search
CPC F24C 15/101; F24C 15/2028; F24C 15/2042; F24C 15/102
See application file for complete search history.

(56) References Cited

U.S. PATENT DOCUMENTS

| | | |
|---|---|---|
| 6,851,421 B2 | 2/2005 | Livchak et al. |
| 6,899,095 B2 | 5/2005 | Livchak et al. |
| 8,893,709 B2 | 11/2014 | Negandhi et al. |
| 9,581,337 B2 | 2/2017 | Heinonen |
| 10,935,247 B2 | 3/2021 | Kim et al. |
| 2007/0113839 A1 | 5/2007 | Lee et al. |

(Continued)

FOREIGN PATENT DOCUMENTS

| | | |
|---|---|---|
| CN | 104406209 A | 3/2015 |
| EP | 2138771 A1 | 12/2009 |

(Continued)

OTHER PUBLICATIONS

Korean Office Action for Koren Patent Application No. 10-2020-0087765 dated Nov. 5, 2024.

(Continued)

*Primary Examiner* — Alfred Basichas
(74) *Attorney, Agent, or Firm* — CANTOR COLBURN LLP

(57) ABSTRACT

A cooking device includes a main body including an upper side and a lower side opposing each other, a cooking surface at the upper side of the main body, and an air shield generator which draws air from outside the main body, at the lower side of the main body, and provides the air to outside of the main body as an air shield which is at the upper side of the main body, adjacent to the cooking surface and flowing in a direction away from the cooking surface.

20 Claims, 9 Drawing Sheets

(56) References Cited

U.S. PATENT DOCUMENTS

2010/0000512 A1  1/2010 Huang
2010/0095949 A1  4/2010 Huang
2019/0101293 A1  4/2019 Kim et al.
2021/0148574 A1  5/2021 Kim et al.

FOREIGN PATENT DOCUMENTS

| | | |
|---|---|---|
| EP | 2175204 A1 | 4/2010 |
| EP | 3358259 B1 | 1/2020 |
| JP | H09137983 A | 5/1997 |
| JP | 4022899 B2 | 12/2007 |
| JP | 2015155778 A | 8/2015 |
| JP | 5809921 B2 | 11/2015 |
| KR | 1020000039278 A | 7/2000 |
| KR | 1020120009813 A | 2/2012 |
| KR | 1020150094024 A | 8/2015 |
| KR | 101586379 B1 | 1/2016 |
| KR | 102011425 B1 | 8/2019 |
| KR | 1020200037719 A | 4/2020 |

OTHER PUBLICATIONS

International Search Report mailed Jul. 16, 2021 for PCT/KR2021/003637.

COOKING DEVICE

CROSS-REFERENCE TO RELATED APPLICATIONS

This application is a continuation application of International Application No. PCT/KR2021/003637 designating the United States, filed on Mar. 24, 2021, at the Korean Intellectual Property Receiving Office and claiming priority to Korean Patent Application No. 10-2020-0087765, filed on Jul. 15, 2020, at the Korean Intellectual Property Office, the disclosures of which are incorporated by reference herein in their entireties.

BACKGROUND

Field

This disclosure relates to a cooking device. More particularly, this disclosure relates to a cooking device that forms an air shield for guiding contaminants generated from food during cooking, to be smoothly discharged, such as through a hood.

Description of the Related Art

In general, in a cooking device installed in a kitchen, a hood is disposed above the cooking device to guide contaminants away from the cooking device and discharge such contaminants generated during cooking. When cooking using a cooking device, contaminants, for example, oil mist, incombustible gas, odor, and the like are generated from the cooked food. Contaminants generated during cooking are sucked into the hood through an exhaust device disposed inside the hood, and then discharged to the outside of a house.

The hood is manufactured to have an exhaust air amount suitable for the noise of an exhaust device disposed therein and an internal pressure standard, and is generally designed to be smaller than the size of the top surface of the cooking device. Therefore, some of the contaminants generated during cooking are discharged into the hood, but remaining contaminants (about 60%) are not discharged to outside the house through the hood but remain circulating in the kitchen.

There is a problem that when the operating speed of the exhaust device increases to increase the emission of contaminants generated during cooking or to capture the remaining contaminants, exhaust noise may increase.

SUMMARY

Technical Problem

Embodiments of the disclosure address the above-mentioned problems, and provide a cooking device capable of forming an air shield guiding contaminants generated during cooking to be sucked into a hood.

Embodiments of the disclosure provide a cooking device capable of cooling electric appliances disposed inside an induction device using air supplied to form an air shield.

Technical Solution

Provided is a cooking device including a main body, an induction device disposed on top of the main body, and an air shield forming device which forms air shield by spraying air sucked from a lower side of the main body upward from the induction device.

The air shield forming device may include a fan motor unit, a first duct for guiding air from the lower side of the main body toward the induction device according to driving of the fan motor unit, a second duct for guiding air provided from the first duct to one side of the induction device, and a nozzle member to form air shield by spraying air guided to the second duct to an upper side of the induction device.

An inlet of the nozzle member may be spaced apart from an outlet of the second duct in a horizontal direction.

An inlet of the nozzle member may be disposed at a position higher than the outlet of the second duct.

A lower end of an upward guide disposed farther from the second duct, between a pair of upward guides of the nozzle member, may be extended to a position lower than the outlet of the second duct.

The cooking device may further include a waste collecting member coupled with the nozzle member at an upper side of waste collecting member and being connected to the outlet of the second duct at one side of waste collecting member to allow ventilation.

The nozzle member may be formed to have a predetermined length along a side frame of the induction device, and the second duct may get wider from a portion distant from the inlet of the second duct by a predetermined distance toward the nozzle member.

A plurality of discharge ports may be formed in the nozzle member.

The fan motor unit may be disposed at a point connecting the first duct and the second duct.

The fan motor unit may be embedded in a lower portion of the first duct.

The first duct may be disposed along an inner side of a side panel of the main body.

A heat dissipation member for cooling a printed circuit board of the induction device may be located at a part of the second duct.

The cooking device may further include an additional air shield forming device having one portion disposed in the main body and a remaining portion disposed in the induction device, and the air shield forming device may form air shield in an upper direction of one of opposite sides of the induction device, and the additional air shield forming device may form air shield in an upper direction of the other of the opposite sides of the induction device.

One of the air shield forming device and the additional air shield device being disposed closer to a front panel of the induction device may further include an additional duct for guiding air to the front panel side, and an additional nozzle member for forming air shield by spraying air guided from the additional duct to an upper side of the front panel.

The main body may have a cooking chamber inside and a door for opening and closing the cooking chamber may be hinge-connected in a front surface.

In order to achieve the objective, the disclosure provides a cooking device including an oven device having a door on the front surface thereof, an induction device disposed on the upper portion of the oven device, and first and second air shield forming devices for forming air shield by spraying air sucked from the lower side of the oven device in each upward direction of the left and right sides of the induction device.

A portion of the first air shield forming device may be disposed in a vertical direction along a first side panel of the oven device and the remaining portion is disposed in a horizontal direction along the inside of the induction device. The second air shield forming device has a portion disposed in a vertical direction along a second side panel of the oven device disposed opposite to the first side panel and the remaining portion disposed in a horizontal direction along the inside of the induction device.

The first air shield forming device may include a first nozzle member disposed at a predetermined length on one side of the oven device, a first duct disposed along the inside of a first side panel of the oven device, a second duct for guiding the air guided to the first duct to the first nozzle member, and a first fan motor unit disposed at a connection point of the first duct and the second duct.

The second air shield forming device may include a second nozzle member arranged at a predetermined length on the other side of the oven device, a third duct arranged along the inside of a second side panel of the oven device, a fourth duct for guiding the air guided to the third duct to the second nozzle member, and a second fan motor unit arranged at a connection point of the third duct and the fourth duct.

The inlet of the first nozzle member may be disposed to be spaced apart from the outlet of the second duct in the horizontal direction and is disposed at a position higher than the outlet of the second duct, and the inlet of the second nozzle member is disposed to be spaced apart from the outlet of the fourth duct in the horizontal direction and disposed at a position higher than the outlet of the fourth duct.

In the cooking device, one of the first and second air shield forming devices disposed closer to the front panel of the induction device may further include an additional duct for guiding air toward the front panel, and an additional nozzle member for forming air shield by spraying the air guided from the additional duct to the upper side of the front panel.

Effect of Invention

As described above, according to the disclosure, it is possible to minimize contaminants circulated to a kitchen space by increasing the discharge amount of contaminants through the hood, and also, it is not necessary to increase the operation speed of a discharge device provided in the hood in order to increase the discharge efficiency of contaminants, thereby significantly reducing exhaust noise.

DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
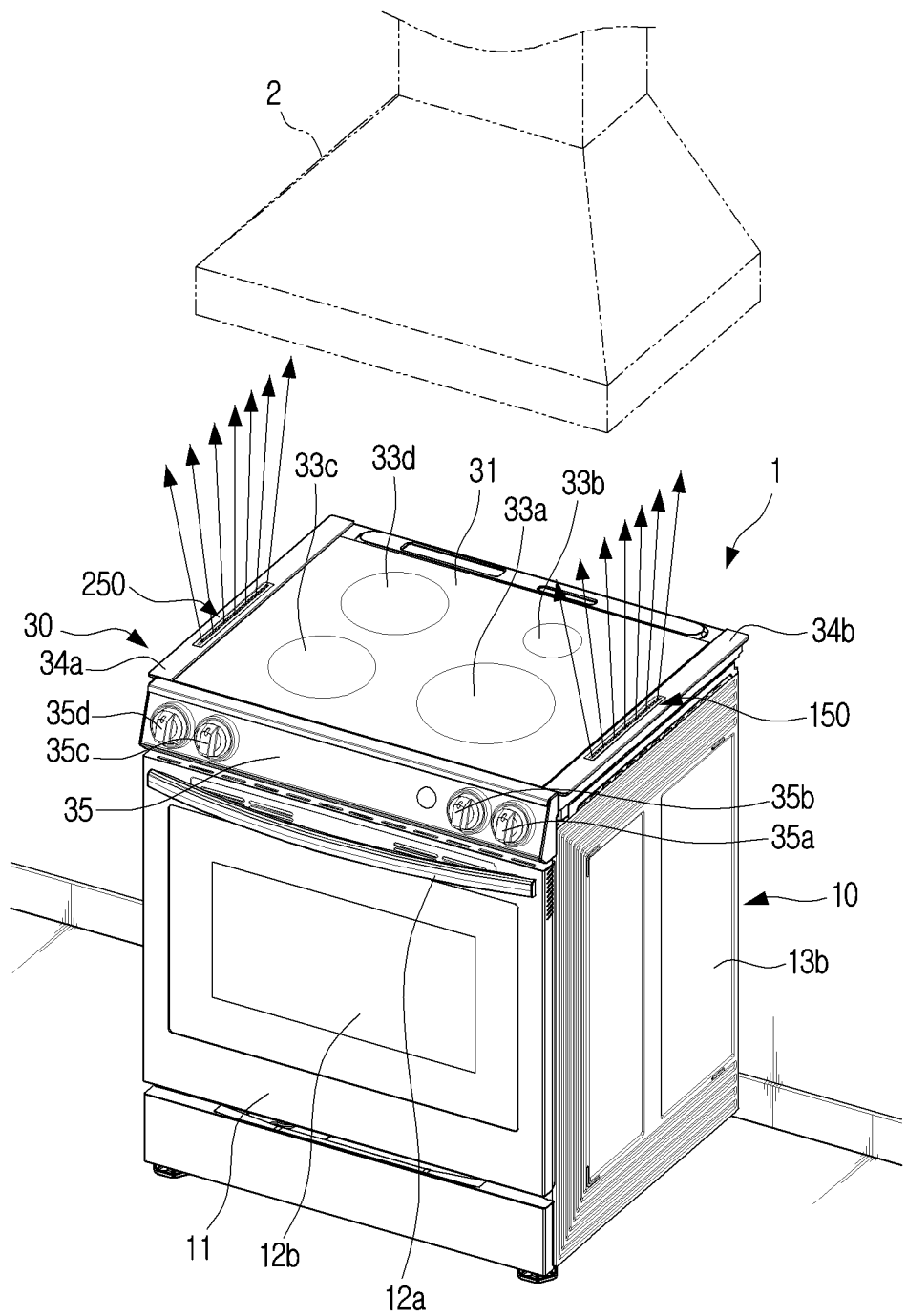
FIG. 1 is a perspective view illustrating a cooking device according to an embodiment of the disclosure.

Hereinafter, various embodiments will be described in detail with reference to the accompanying drawings. The embodiments described herein may be variously modified. Certain embodiments may be described in the drawings and described in detail in the detailed description. However, the specific embodiments disclosed in the accompanying drawings are to facilitate understanding various embodiments. Accordingly, it is to be understood that the invention is not limited to the specific embodiments disclosed in the accompanying drawings, and it is to be understood that all equivalents or alternatives included within the spirit and scope of the invention are included.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout. For example, a reference number labeling a singular form of an element within the drawing figures may be used to reference a plurality of the singular element within the text of specification.

It will be understood that when an element is referred to as being related to another element such as being "on" another element, it can be directly on the other element or intervening elements may be present therebetween. In contrast, when an element is referred to as being related to another element such as being "directly on" another element, there are no intervening elements present.

In this disclosure, the terms first, second, etc. may be used to describe various components, but these components are not limited by the terms discussed above. The terms described above are used only to distinguish one component from another component.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In the following description of the disclosure, a detailed description of known functions or configurations incorporated herein will be shortened or omitted when it may make the subject matter of the present disclosure rather unclear.

Hereinafter, a cooking device 1 according to an embodiment of the disclosure will be described in detail with reference to the drawings.

FIG. 1 is a perspective view illustrating a cooking device 1 according to an embodiment of the disclosure.

Referring to FIG. 1, a cooking device 1 according to an embodiment of the disclosure may form air shield in a film form or shape having a predetermined thickness in at least two places (e.g., left and right of the cooking device 1), such as by spraying air upward or in a direction away from a cooking surface of the cooking device 1. Accordingly, contaminants (e.g., oil mist, incombustible gas, odor, etc.) generated during cooking at the cooking surface (or cooking plane) may be guided within the air shield, in a direction away from the cooking surface, and toward the hood 2.

The cooking device 1 according to an embodiment of the disclosure may include a main body 10, an induction device 30 disposed above the main body 10, and first and second air shield forming devices 100 and 200 for forming air shield in upward direction (Z-axis direction) from more than one side of the induction device, respectively. The air shield may be formed (or provided) at opposing sides of the induction device 30, without being limited thereto.

The main body 10 may be an oven device or heating device, for cooking an object such as food, but is not limited thereto. The main body 10 may include a cooking chamber (not shown) for heating and/or cooking food at an inside of the main body 10, and a door 11 at a front of the main body 10 for opening and closing the cooking chamber.

The lower end of the door 11 which is furthest from the cooking surface may be hingedly-connected to the main body 10, and a handle 12a may be disposed on the front side of the door 11. The door 11 may be coupled with or include a window 12b through which the cooking chamber may be visible from outside the cooking device 1, such as to be observed from outside the cooking device 1 by a user.

The height of the main body 10 which is taken along the Z-axis direction from a reference surface such as a floor, is defined such that contaminants generated when cooking food in cooking containers (e.g., pots, frying pans, etc.) accommodated on a cooking plate 31 (e.g., cooking surface) of the induction device 30 can be properly guided away from the cooking plate 31, to be transported into and discharged through the hood 2.

In an upper portion of the induction device 30, a cooking plate 31 having a predetermined strength is provided for allowing a cooking container to be placed and supported on the upper portion.

The cooking plate 31 may be formed of tempered glass like ceramic glass so that the cooking plate 31 is not easily damaged.

Referring to FIG. 1, the cooking plate 31 may be provided with a plurality of heating areas 33a, 33b, 33c and 33d. A plurality of induction heating coils (not shown) for heating a cooking container seated on the cooking plate 31 at a respective one of the heating area, may be disposed at a lower side (inside of the induction device 30) of each of the heating areas 33a, 33b, 33c and 33d. The plurality of induction heating coils may generate a magnetic field and/or an electromagnetic field to heat the cooking container which is on the respective heating area among the a plurality of heating areas 33a, 33b, 33c and 33d.

For example, when a driving current (e.g., electrical current) is supplied to the induction heating coil, a magnetic field may be induced around the induction heating coil. When an alternating current (e.g., alternating electrical current), of which the size and direction are changed over time, is supplied to the induction heating coil, a magnetic field of which the magnitude and direction are changed over time may be induced around the induction heating coil.

A magnetic field around the induction heating coil may pass through the cooking plate 31 and may reach a cooking container which is seated on the cooking plate 31 at the respective heating area.

An eddy current (EI) rotating around a magnetic field may be generated in the cooking container by a magnetic field of which the size and direction change over time. As such, a phenomenon in which an EI is generated due to a magnetic field changing over time is referred to as an electromagnetic induction phenomenon. An electric resistance heat may occur in the cooking container due to the EI. The electric resistance heat is a heat generated in the resistor when a current flows in the resistor, and is also referred to as a Joule heat. The cooking container is heated by the electric resistance heat, and the food contained in the cooking container may be heated and/or cooked.

As described above, the plurality of induction heating coils respectively arranged on the lower side of the cooking plate 31 at the plurality of heating areas 33a, 33b, 33c and 33d may heat the cooking container by using electromagnetic induction and/or electric resistance heat.

Figure 2:
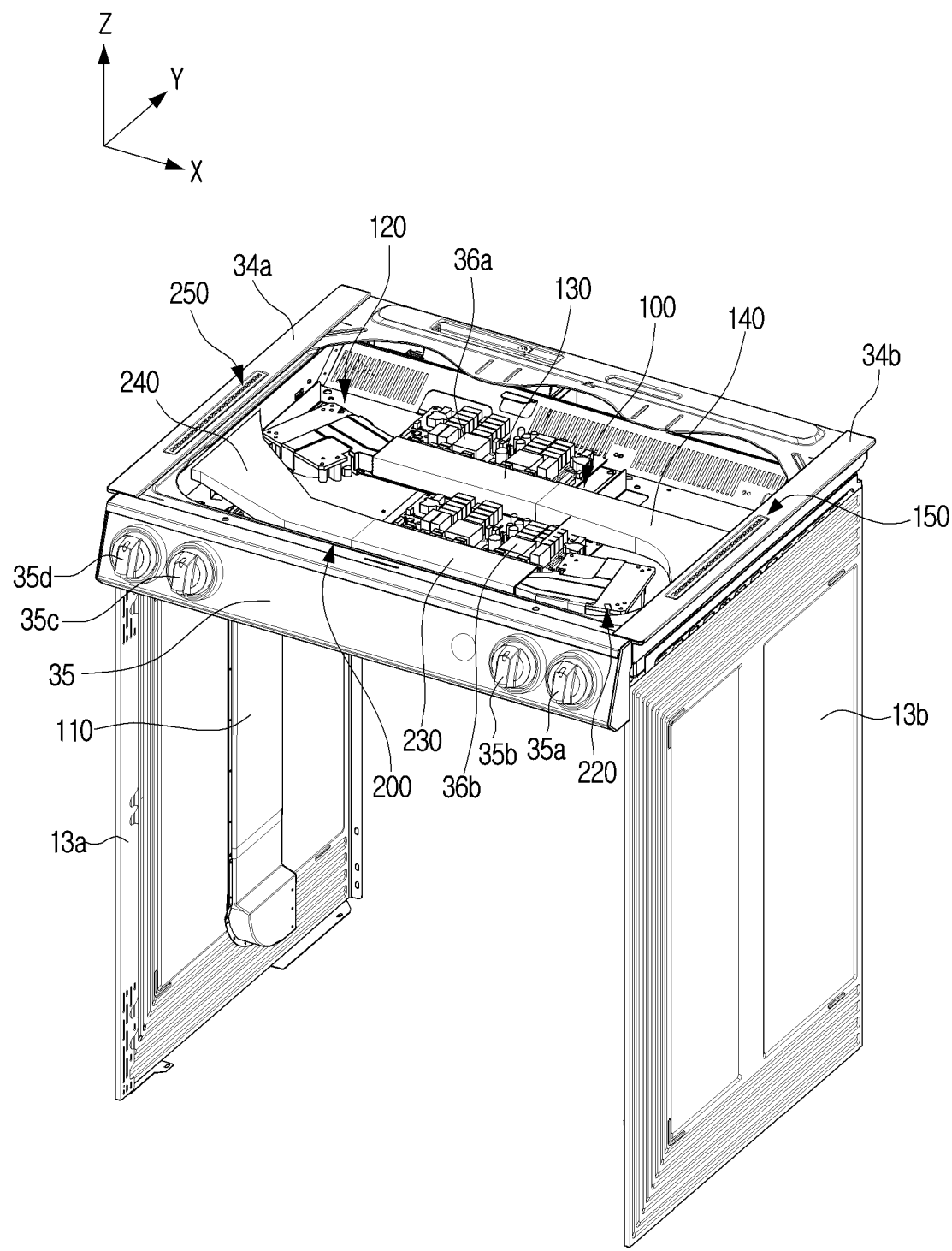
FIG. 2 is a perspective view illustrating the inside of an induction unit to show a structure for forming air shield of a cooking device according to an embodiment of the disclosure.

FIG. 2 is a perspective view illustrating an embodiment of an induction unit which forms an air shield of a cooking device 1 according to an embodiment of the disclosure.

Referring to FIG. 2, the induction device 30 may include first and second printed circuit boards 36a and 36b as electrical components for controlling a plurality of induction heating coils therein, and a plurality of adjustment knobs 35a, 35b, 35c and 35d capable of turning on/off a plurality of induction heating coils and controlling a heating temperature. A plurality of adjustment knobs 35a, 35b, 35c and 35d may be arranged on a front panel 35 arranged in front of the induction device 30 at predetermined intervals.

A left frame 34a and a right frame 34b may be respectively arranged on the left and right sides of the induction device 30, each frame extending along the vertical direction (Y-axis direction) of the induction device 30. An element which "extends" along a particular direction may have a major (or maximum) dimension along such direction, such as to define a longitudinal direction, without being limited thereto.

A horizontal direction (X-axis direction) crosses the vertical direction. A plane may be defined by a first direction (X-axis direction) and a second direction (Y-axis direction) crossing each other. A thickness or height direction of the cooking device 1 and various components thereof, may be taken along a third direction (Z-axis direction) which crosses each of the first and second directions. A front and rear of the cooking device 1 may be defined along the vertical direction, a left and right of the cooking device 1 may be defined along the horizontal direction, and a top and bottom of the cooking device 1 may be defined along the height direction.

A first nozzle member 150 (otherwise referred to as a spray nozzle, an air nozzle or an air discharge nozzle) of a first air shield forming device 100 to be described later may be disposed in (or at) the right frame 34b. The first nozzle member 150 may be arranged or extended along the longitudinal direction of the right frame 34b and may be formed (or provided) to have a length smaller than the length of the right frame 34b. That is, a total (or maximum) length of the first nozzle member 150 may be less than a total (or maximum) length of the right frame 34b.

A second nozzle member 250 corresponding to the first nozzle member 150 along the horizontal direction, may be disposed in (or at) the left frame 34a. The second nozzle member 250 forms a part of the second air shield forming device 200 to be described later, is disposed along the longitudinal direction of the left frame 34a, and may be formed to have a length smaller than the length of the left frame 34a.

Figure 3:
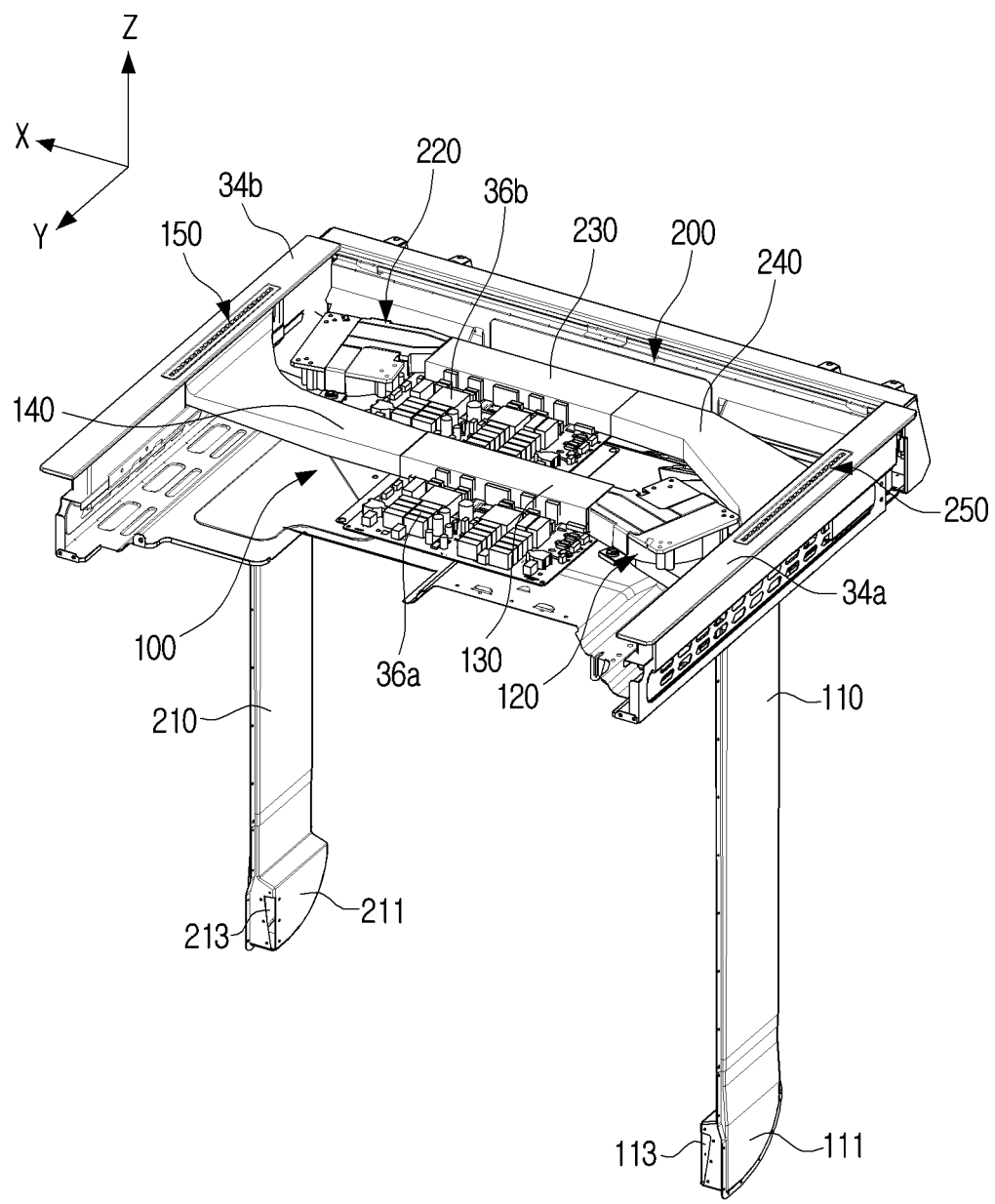
FIG. 3 is a perspective view of a rear view of the cooking device shown in FIG. 2, from which left and right panels are removed.
Figure 4:
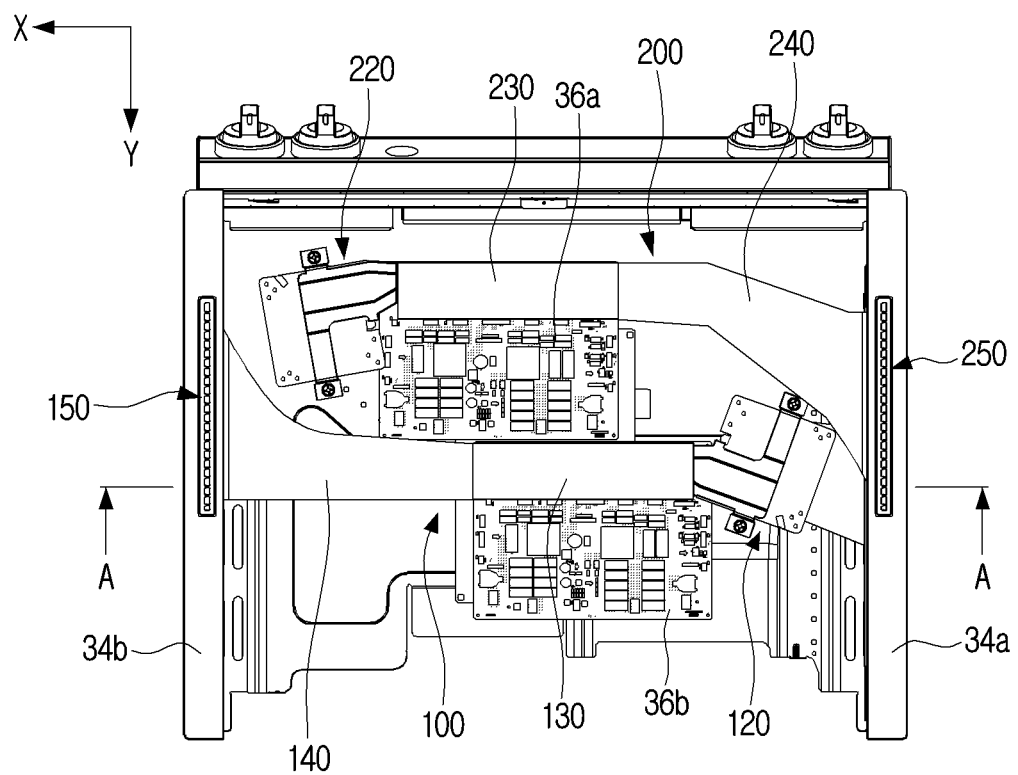
FIG. 4 is a top plan view illustrating a cooking device shown in FIG. 3.

FIG. 3 is a perspective view of a rear of the cooking device 1 shown in FIG. 2, from which left and right panels are removed. FIG. 4 is a top plan view illustrating a cooking device 1 shown in FIG. 3. A plan view may indicate a view along a height direction (Z-axis direction) of a plane, such as a plane defined by the horizontal and vertical directions crossing each other as shown in FIG. 4.

Referring to FIGS. 3 and 4, the first air shield forming device 100 as an air shield generator may include a first duct 110 disposed along the inside of the left panel 13a (see FIG. 2), at the left side (e.g., a lateral side among lateral sides) of the main body 10, a fan motor unit 120 which draws air through the first duct 110 to generate an airflow (e.g., an airflow generator), a second duct disposed inside the induction device 30 and through which the air provided by the fan motor unit 120 is guided to the first spray nozzle 150 at the right side (e.g., a lateral side among lateral sides which connect a front side to a rear side), and a first spray nozzle 150 which sprays the guided air in the upward direction, away from the cooking device 1, from (or at) the right side of the induction device 30. That is, the main body further includes a front side (−Y-axis direction), a rear side (+Y-axis direction) opposite to the front side, and lateral sides (along X-axis direction) opposing each other and each connecting the front side to the rear side, and the air shield generator (e.g., among the first and second air shield forming devices 100, 200 and 310/330) including an airflow generator (e.g., fan motor unit 120) which generates an airflow, a first duct 110 which is connected to the airflow generator and into which the air from the outside of the main body 10 enters the air shield generator, the first duct 110 guiding the air from the lower side of the main body 10 and toward the cooking surface, by the airflow, a second duct which is connected to the airflow generator and the first duct 110, the second duct guiding air from the first duct to a lateral side of the main body 10 among the lateral sides, and an air discharge nozzle (e.g., first spray nozzle 150) which is connected to the second duct and through which guided air from the second duct is discharged from the air shield generator to define the air shield.

A lower end portion 111 (e.g., a lower end) of the first duct 110 may be furthest from the cooking plate 31 and may be located at a portion adjacent to the lower end of the main body 10, and an upper end portion 115 may be inserted into (or extended into) the induction device 30 through the lower portion of the induction device 30, to be connected to the fan motor unit 120 to allow ventilation. As being connected, the above-described elements may be in fluid connection, flow connection, air connection, etc. to provide an airflow path from the lower end portion 111, through the first duct 110, through the second duct and finally through the first nozzle member 150.

An air suction port 113 through which air may be introduced into the first duct 110 may be formed in the lower end portion 111 of the first duct 110. The air suction port 113 as an air inlet to the first air shield forming device 100, may be located at a portion adjacent to the lower end of the main body 10. Accordingly, the air introduced into the air suction port 113 flows into and through the first nozzle member 150 to be sprayed outwardly from the first nozzle member 150 to form an air shield of the cooking device 1.

In this example, the first air shield forming device 100 may be used to cool down the first printed circuit board 36a, by using the air introduced into the first duct 110 as a cooling material. The lower the temperature of air introduced into the first duct 110, the more advantageous to increase the cooling efficiency of the first printed circuit board 36a. Heat emitted from the main body 10 or the induction device 30 is mainly heated around the upper part and the middle part of the main body 10 and the air around the upper part of the induction device 30 when cooking food by using the main body 10 made of an oven device or the induction device 30. Therefore, the first duct 110 may suck air at a portion adjacent to the lower side of the main body 10 having a relatively low temperature around the cooking device 1 of the disclosure, by disposing the air suction port 113 to be adjacent to the lower side of the main body 10.

Figure 5:
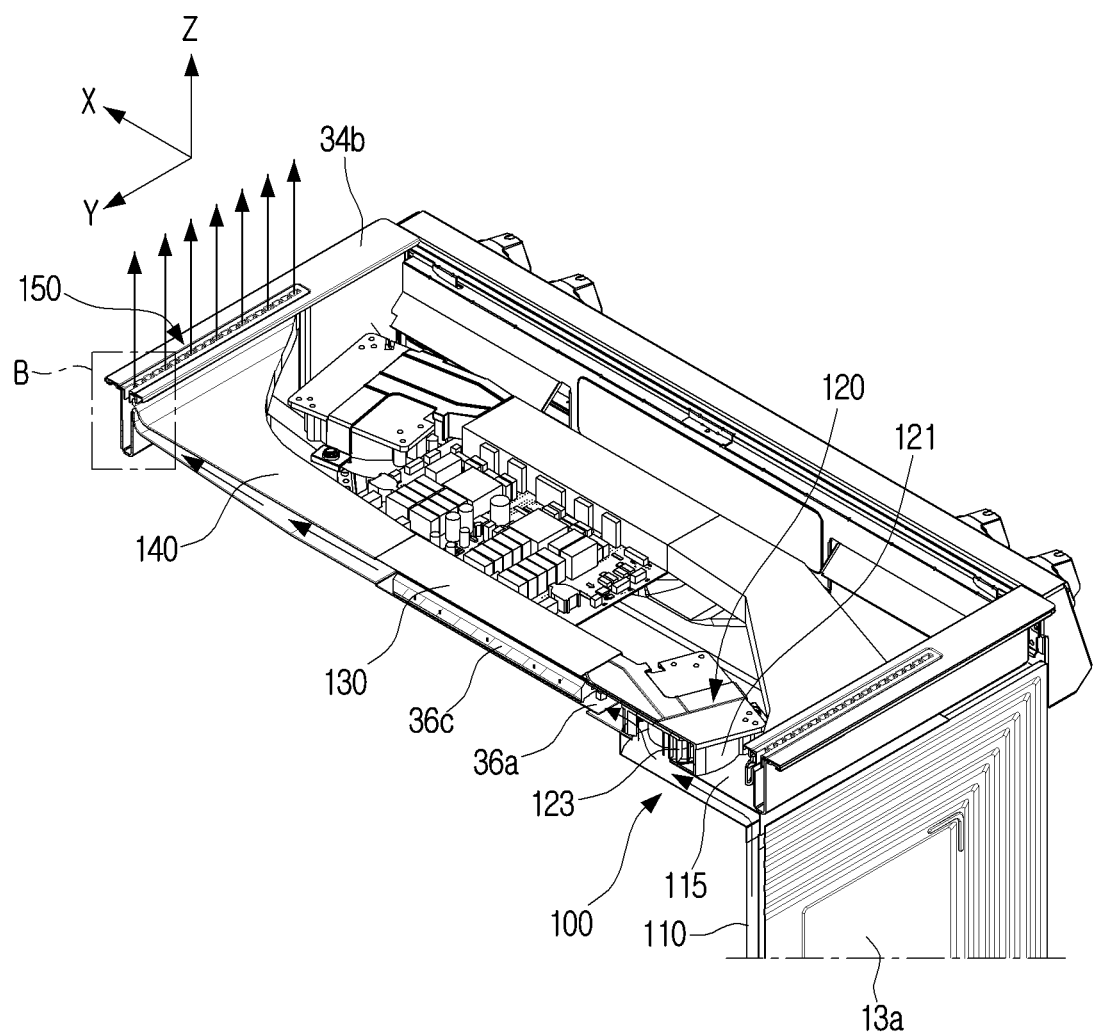
FIG. 5 is a cross-sectional view of the air blowing flow path in the cooking device taken along line A-A of FIG. 4.

FIG. 5 is a cross-sectional view of the air flow path within the cooking device 1 taken along line A-A of FIG. 4.

Referring to FIG. 5, the fan motor unit 120 may include a housing 121 disposed inside the induction device 30, a motor (not shown) rotatably disposed inside the housing 121, and a fan 123 rotating by receiving power from the motor.

The housing 121 has one end (e.g., a first end or air inlet) connected to the upper end portion 115 of the first duct 110 to allow drawing of air through the first duct 110 from the lower end portion 111 thereof, and the other end (e.g., a second end opposite to the first end) connected to one end of the first portion 130 of the second duct to allow moving of drawn air into the second duct.

The motor may be a small DC motor. The motor may be electrically connected to the first printed circuit board 36*a* and/or a predetermined printed circuit board (not shown) disposed in the cooking device 1, to receive and drive a power and an operation signal (e.g., electrical signal).

In the disclosure, the fan motor unit 120 is disposed at a point where the first duct 110 and the first portion 130 of the second duct essentially meet each other, to connect the first duct 110 to the second duct at the first portion 130 thereof, but is not limited thereto. For example, when a motor provided in the fan motor unit 120 is a DC motor having a low heat resistance characteristic, the fan motor unit 120 may be disposed in the lower end portion 111 of the first duct 110, which is not affected by heat emitted from the cooking device 1. That is, the first duct 110 includes a lower portion corresponding to the lower end of the main body 10, and the airflow generator (e.g., the fan motor unit 120) is disposed at the lower portion of the first duct 110.

In this example, the lower end portion 111 of the first duct 110 may have a volume (cross-sectional area related to a length along the first duct 110) larger than a remaining portion of the first duct 110, in order to secure a space (e.g., an airflow passage) in which the fan motor unit 120 may be disposed.

The second duct may be disposed inside the induction device 30 and may guide air from the fan motor unit 120 to the first nozzle member 150. The second duct may include a first portion 130 and a second portion 140 which is closer to the first nozzle member 150 than the first portion 130.

The first portion 130 of the second duct has one end (e.g., an inlet) connected to the other end of the housing 121 of the fan motor unit 120 to allow drawn air to enter the second duct, and the other end (e.g., an outlet) connected to one end of the second portion 140 to allow drawn air to enter the second portion 140. That is, the cooking device 1 may include the main body 10 including an upper side (+Z-axis direction) and a lower side (−Z-axis direction) opposing each other, a cooking surface (e.g., the cooking plate 31) at the upper side of the main body 10, and an air shield generator (e.g., among the first and second air shield forming devices 100, 200 and 310/330) which draws air from outside the main body 10, at the lower side of the main body 10, and provides the air to outside of the main body 10 as an air shield (e.g., either group of upward arrows in FIG. 1) which is at the upper side of the main body 10, adjacent to the cooking surface and flowing in a direction away from the cooking surface. In an embodiment, the air shield generator is provided in plural including a plurality of air shield generators which respectively provide the air shield at two sides among the plurality of sides (e.g., front, rear and lateral sides) of the main body 10 (or of the cooking surface).

The durability of the first printed circuit board 36*a* as an electrical component may be degraded by heat emitted from a plurality of adjacent induction heating coils. To solve this problem, cooling of the first printed circuit board 36*a* may be assisted by using air passing through the first portion 130.

For example, a heat dissipation member 36*c* may be disposed on the first printed circuit board 36*a*, and the first portion 130 may be disposed to cross the first printed circuit board 36*a* while covering the heat dissipation member 36*c*. The air passing through the first portion 130 is introduced from the lower side of the main body 10, which is not affected by heat emitted from the cooking device 1, and thus the heat dissipation member 36*c* may be effectively cooled.

The second portion 140 of the second duct has one end (e.g., an inlet) connected to the other end of the first portion 130 to allow drawn air to enter the second portion 140, and the other end (e.g., outlet) connected to the first nozzle member 150.

The second duct may have a length extended along the X-axis direction, and a width taken in the Y-axis direction. The second portion 140 of the second duct may be formed to be gradually wider in a direction from a portion (for example, a middle portion of the second portion 140) of the second portion 140 toward the outlet end closest to the first nozzle member 150, in consideration of the length of the first nozzle member 150. The second portion 140 may have the largest width at a position closest to the first nozzle member 150, along a length of the second portion 140. Accordingly, air may be uniformly supplied to the first nozzle member 150.

Figure 6:
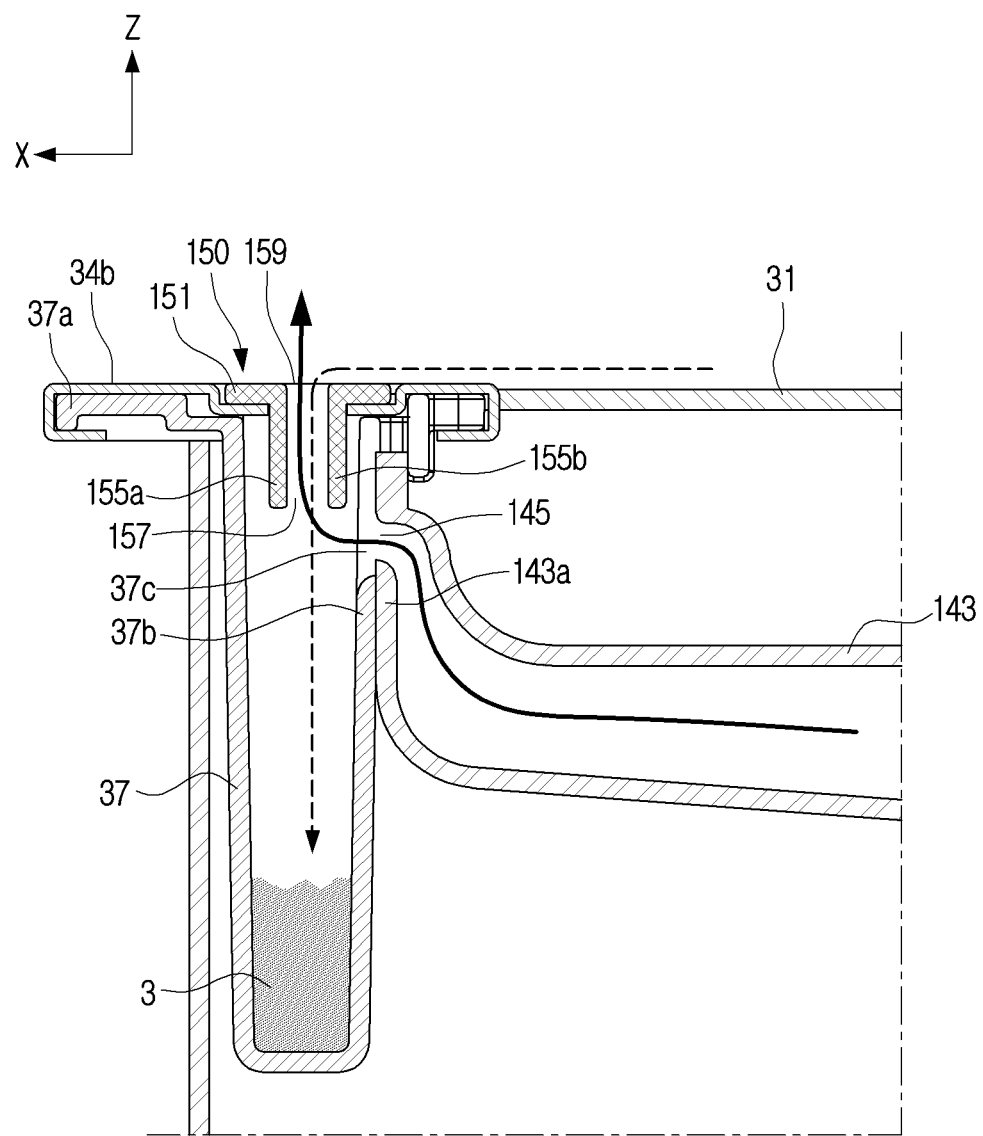
FIG. 6 is an enlarged cross-sectional view illustrating portion B shown in FIG. 5.
Figure 7:
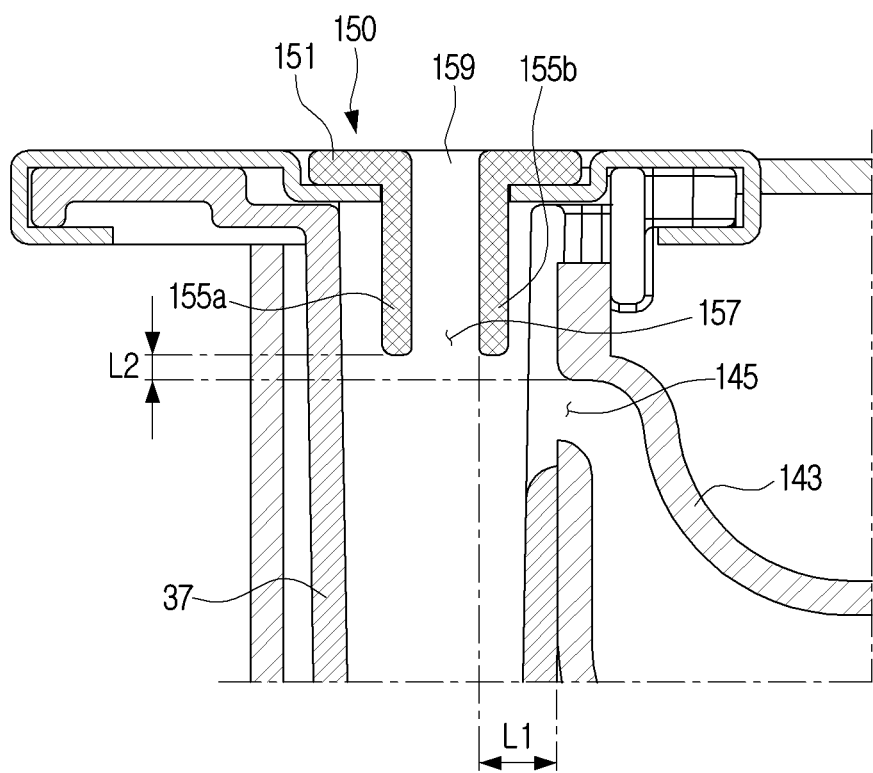
FIG. 7 is a diagram illustrating a top plan view of an embodiment of a first injection nozzle shown in FIG. 6 and a second portion of a second duct.

FIG. 6 is an enlarged cross-sectional view illustrating portion B shown in FIG. 5. FIG. 7 is a plan view illustrating a relationship between a first injection nozzle shown in FIG. 6 and a second portion 140 of a second duct.

Referring to FIG. 6, the second portion 140 of the second duct may have an outlet 145 formed at the other end thereof, to discharge air to outside the second duct. The first nozzle member 150 may have an airflow direction (e.g., disposition direction) along the Z-axis direction. The outlet 145 of the second portion 140 may be disposed approximately parallel to the disposition direction of the first nozzle member 150, and may be formed to have a length similar to the length of the first nozzle member 150. The length may be taken along the Z-axis direction or along the airflow direction. In FIG. 6, for example, the lateral sides (of the main body and/or of the cooking surface) face each other along a horizontal direction (X-axis direction), the air discharge nozzle includes an inlet 157 through which the guided air from the second duct enters the air discharge nozzle, the second duct includes an outlet 145 through which the guided air exits from the second duct, and the inlet of the air discharge nozzle is spaced apart from the outlet of the second duct, along the horizontal direction.

The outlet 145 of the second portion 140 may be disposed adjacent to an inlet 157 of the first nozzle member 150. The air discharged through the outlet 145 of the second duct is introduced into the inlet 157 of the first nozzle member 150 and then sprayed in the upward direction (+Z-axis direction) through a plurality of discharge ports 159 formed at the upper end of the first nozzle member 150. Each of a discharge port 159 is open to outside the cooking device 1, and in communication (fluid, air, etc.) with the second duct. The air sprayed by the plurality of discharge ports 159 to outside the cooking device 1, may form air shield (or air curtain) having a predetermined thickness (along the X-axis and/or Y-axis direction) and height (along the Z-axis direction). Since the plurality of discharge ports 159 of the first nozzle member 150 are formed at regular intervals along the Y-axis direction, air may be uniformly sprayed over the entire length of the first nozzle member 150. That is, the air discharge nozzle (e.g., the first nozzle member 150) includes a plurality of discharge ports 159 through which the guided air from the second duct is discharged from the air shield generator to define the air shield, and the plurality of discharge ports are arranged in a direction from the front side to the rear side of the main body 10 (e.g., along the Y-axis direction).

In addition, referring to FIG. 6, as the second portion 140 is gradually narrower toward the outlet 145, such that a velocity of the airflow increases as a distance from the outlet 145 decreases. Accordingly, the air discharged from the outlet 145 of the second portion 140 may flow into the first nozzle member 150 at a high speed. The air sprayed through the plurality of discharge ports 159 of the first nozzle member 150 may form air shield having a predetermined height according to the velocity of the air.

The first nozzle member 150 may be coupled to the upper portion of a waste collecting member 37. The waste collecting member 37 as a waste collector may collect waste 3, such as a liquid, solid, etc., which overflows from the cooking container and runs along the cooking plate 31 when cooking. The waste 3 flowing along the cooking plate 31 may be collected inside the waste collecting member 37 through a plurality of discharge ports 159 of the first nozzle member 150 as shown by the dotted line in FIG. 6.

An upper end portion 37a of the waste collecting member 37 is fixed to a right frame 34b, and one side thereof is connected to the second portion 140 to allow ventilation. One side wall 37b of the waste collecting member 37 may be in close contact with an end portion 143a of wall 143 which forms the other end of the second portion 140. As being in contact, elements may form an interface therebetween, without being limited thereto. Accordingly, the air discharged from the outlet 145 of the second portion 140 is prevented from leaking between the waste collecting member 37 and the second portion 140 since a gap is not generated between the waste collecting member 37 and the second portion 140.

Another opening 37c connecting to the outlet 145 of the second portion 140 may be formed on one side of the waste collecting member 37. That is, the waste collector (e.g., the waste collecting member 37) is connected to the air discharge nozzle at an upper side of the waste collector, and connected to the outlet 145 of the second duct at a lateral side of the waste collector. Accordingly, the air discharged to the outlet 145 of the second portion 140 may be introduced into the waste collecting member 37 through the opening 37c of the waste collecting member 37, and then introduced into the inlet 157 of the first nozzle member 150.

The outlet 145 of the second portion 140 and the opening 37c of the waste collecting member 37 are preferably disposed as far as from the bottom of the waste collecting member 37 possible so that the waste 3 collected in the waste collecting member 37 is not introduced into the second portion 140.

It is necessary to prevent waste 3 introduced through the plurality of discharge ports 159 of the first nozzle member 150 from flowing into the outlet 145 of the second portion 140 when flowing down through the inlet 157. To this end, as shown in FIG. 7, the outlet 145 of the second portion 140 may be spaced apart from the inlet 157 of the first nozzle member 150 by a first distance L1 along the X-axis direction.

Also, the outlet 145 of the second portion 140 may be spaced apart from the lower end of the first nozzle member 150 by a second distance L2 along the Z-axis direction, so that the air discharged from the outlet 145 of the second portion 140 may be smoothly introduced into the inlet 157 of the first nozzle member 150. Referring to FIG. 7, for example, the upper side and the lower side of the main body oppose each other along a height direction (Z-axis direction), and the inlet 157 of the air discharge nozzle is closer to the cooking surface (e.g., the cooking plate 31) than the outlet 145 of the second duct.

Accordingly, interference caused by a pair of vertical guide portions 155a and 155b of the first nozzle member 150 with respect to air moving from the outlet 145 of the second portion 140 to the inlet 157 of the first nozzle member 150, may be minimized.

A pair of vertical guide portions 155a and 155b may be formed to have a predetermined length in a downward direction (e.g., Z-axis direction) from the upper end part 151 of the first nozzle member 150. The inlet 157 is positioned at or defined at a lower end of a pair of vertical guide portions 155a and 155b.

Figure 8:
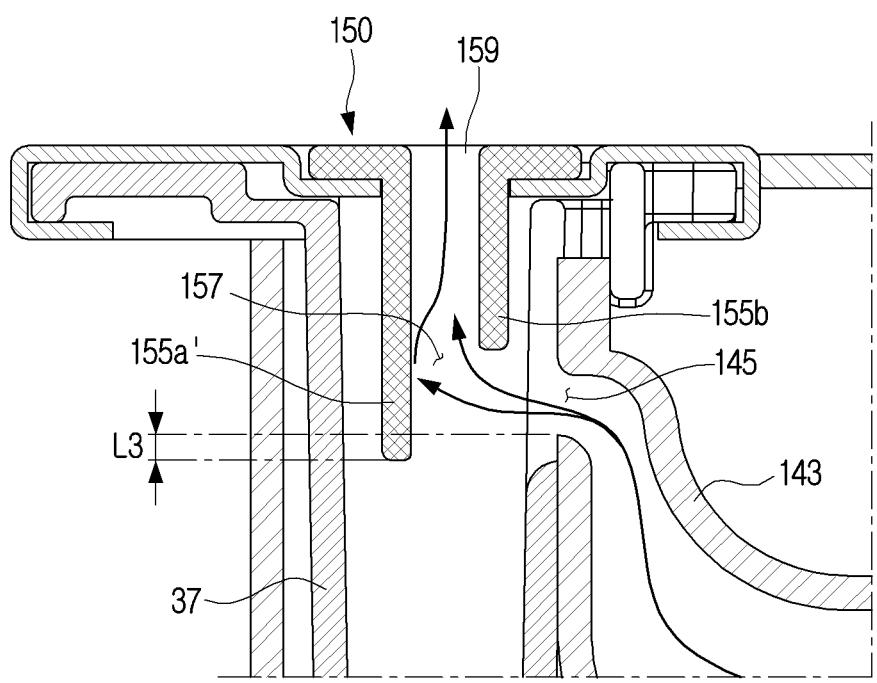
FIG. 8 is a top plan view of an embodiment of an air shield spraying unit.

FIG. 8 is a view illustrating an embodiment of an air shield spraying unit.

As shown in FIG. 8, the vertical guide portion 155a' is disposed farther along the X-axis direction, from the outlet 145 of the second portion 140 among the pair of vertical guide portions 155a' and 155b, may be formed to be longer downward in the Z-axis direction, so that the air discharged from the outlet 145 of the second portion 140 may be more smoothly introduced into the inlet 157 of the first nozzle member 150. That is, the vertical guide portion 155a' faces or overlaps the outlet 145 along the X-axis direction.

Specifically, the lower end (e.g., a distal end furthest along the -Z-axis direction of the vertical guide portion 155a' may be formed to extend to a position lower than the lower end of the outlet 145 of the second portion 140, or lower than the lower position of the outlet 145 of the second portion 140, by a third distance L3. That is, the vertical guide portion 155a' may extend further from the cooking plate 31 than the outlet 145. Referring to FIG. 8, for example, the upper side and the lower side of the main body oppose each other along a height direction (Z-axis direction), the air discharge nozzle further includes a pair of guide portions (the pair of vertical guide portions 155a' and 155b) which face each other along the horizontal direction (X-axis direction and define the inlet 157 therebetween, one guide portion being further from the outlet 145 of the second duct than the other guide portion, each of the pair of guide portions has a lower end which is furthest from the cooking surface, the lower ends of the pair of guide portions being at different distances from the cooking surface, and the lower end of the one guide portion 155a' which is further from the outlet 145 of the second duct than the other guide portion 155b, is further from the cooking surface than the outlet 145 of the second duct, along the height direction.

Accordingly, the air discharged from the outlet 145 of the second portion 140 may be smoothly guided into the first nozzle member 150 along the inside of the vertical guide portion 155a'. That is, the air which exits the second duct at the outlet 145 is incident to an inner surface of the vertical guide portion 155a and flows along the inner surface and the in the airflow direction to the discharge port 159.

The second air shield forming device 200 forms an air shield in the upward direction at the left side of the cooking device 1. The first air shield forming device 100 forms an air shield in an upward direction at the right side of the cooking device 1.

Referring back to FIG. 3, the second air shield forming device 200 has the same configuration as the first air shield forming device 100.

The second air shield forming device 200 may include a first duct 210 disposed along the inside of the right panel 13b (see FIG. 2) of the main body 10, a fan motor unit 220 for sucking air through the first duct 210, first and second portions 230, 240 of a second duct disposed inside the induction device 30 and guiding the air provided by the fan motor unit 220 to the second nozzle member 250, and the second nozzle member 250 for spraying air in the upward direction at the right side of the induction device 30. In FIG. 3, the first duct 210 includes a lower end portion 211 and an air inlet 213 at a distal end of the lower end portion 211.

The other configurations of the second air shield forming device 200 are the same as the configurations of the first air shield forming device 100 and a detailed description will be omitted.

The cooking device 1 according to an embodiment of the disclosure may form an air shield at the left and right of the cooking device 1, respectively, as described above. Moreover, the cooking device 1 according to an embodiment of the disclosure may spray an air shield in an upward direction at the front and/or back of the cooking device 1, as well as at the left and right thereof. That is, the cooking device 1 may include a plurality of air shields at different sides of the main body 10.

Figure 9:
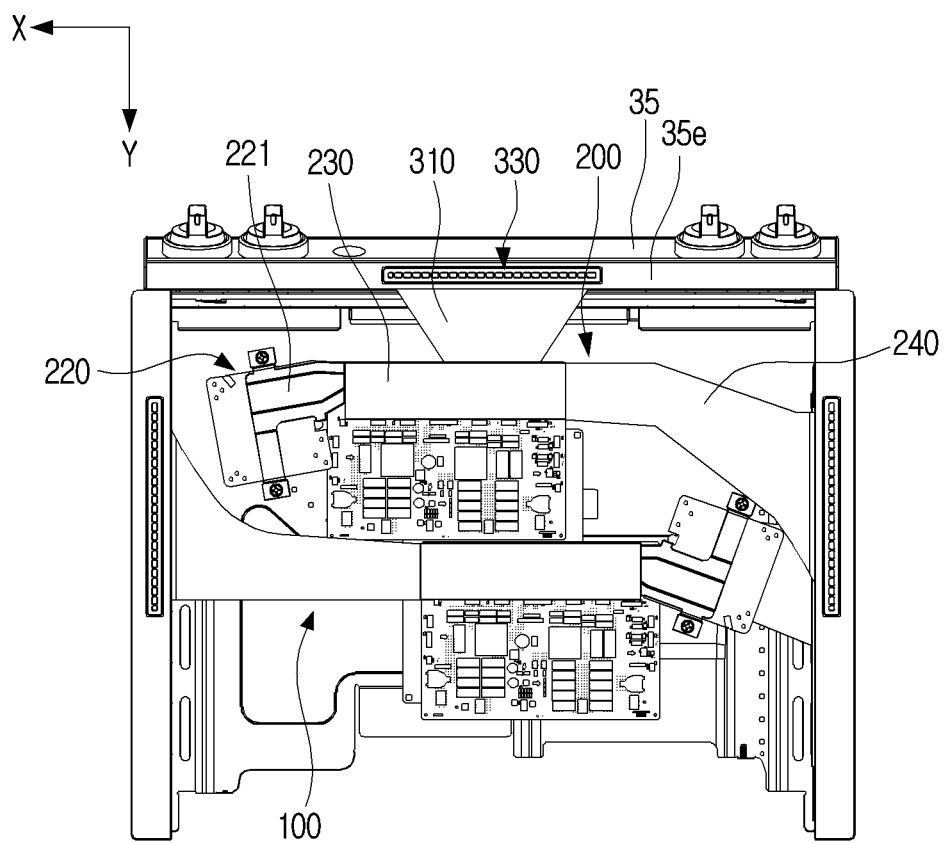
FIG. 9 is a top plan view illustrating an air shield in front of a cooking device according to an embodiment of the disclosure.

FIG. 9 is a plan view illustrating an embodiment of providing an air shield at a front of a cooking device 1 according to an embodiment of the disclosure.

Referring to FIG. 9, in order to form air shield in an upward direction of the cooking device 1 at a front side thereof (+Y-axis direction), the cooking device 1 may include an additional duct 310 (e.g., a third duct) and an additional nozzle member 330 (e.g., a third nozzle member) which is disposed at an upper end portion 35e of the front panel 35.

An additional duct 310 may be connected to a second air shield forming device 200 which is closer to a front panel 35 among the first and second air shield forming devices 100 and 200.

Specifically, the additional duct 310 has one end (e.g., an inlet) connected to the first portion 230 of the second duct of the second air shield forming device 200 to allow entry of air into the additional duct 310, and the other end (e.g., an outlet) connected to an area at the inside of the front panel 35 to allow exit of air from the additional duct 310 to the additional nozzle member 330.

The additional duct 310 may be formed to be wider in a direction from the inlet to the outlet, in consideration of the length of the additional nozzle member 330 along the airflow direction, such as along the −Y-axis direction which is towards the front of the cooking appliance 1. Accordingly, air may be uniformly supplied with respect to the entire length of the additional nozzle member 330.

The additional duct 310 is described as having one end connected to the first portion 230 of the second duct of the second air shield forming device 200, but is not limited thereto. For example, the inlet of the additional duct 310 may be connected to the housing 221 of the fan motor unit 220 to allow flow of air into the additional duct 310 or be connected to the second portion 240 of the second duct of the second air shield forming device 200 to allow flow of air into the additional duct 310. That is, the plurality of air shield generators respectively provide the air shield at the front side and at a lateral side among the lateral sides of the main body 10 (or of the cooking surface). Referring to FIG. 9, within the main body 10, the air shield generator at the front side of the main body 10 (the additional duct 310 together with the additional nozzle member 330) is connected to the air shield generator (e.g., second air shield forming device 200) at the lateral side of the main body 10 (or of the cooking surface).

The additional nozzle member 330 may be formed to have a predetermined length along the longitudinal direction of the front panel 35, such as along the X-axis direction. Since the additional nozzle member 330 has the same structure as the first nozzle member 150 described above, a detailed description thereof will be omitted.

In addition, since the rear side of the cooking device 1 (at the +Y-axis direction) may be disposed to be adjacent to a structure such as a wall of the kitchen, the cooling device 1 does not need to spray the air in the upward direction in the rear of the cooking device 1. However, according to the installation position, the cooking device 1 may be disposed at a place where a wall is not present at the rear of the cooking device 1.

In this case, where a wall is not present at the rear of the cooking device 1, another additional duct (not shown) and another additional nozzle member (not shown) described above may be provided in the cooking device 1 at the rear thereof. Another additional nozzle member may be disposed in a predetermined structure behind the cooking device 1. One end (e.g., an inlet end) of the another additional duct is connected to the first portion 130 of the second duct of the first air shield forming device 100 which is closer to a rear of the cooking device 1 among the first and second air shield forming devices 100 and 200, and the other end (e.g., the outlet end) thereof may be connected to the another additional nozzle member to allow venting of air which forms an air shield at the rear of the cooking device 1.

According to one or more embodiment of the disclosure as described above, air shields are formed in an airflow direction (e.g., the upper direction away from the cooking device 1) at the left and right sides of the cooking device 1, respectively, so that most of contaminants generated at the cooking plate 31 may be guided toward the hood 2. Accordingly, the amount of contaminants discharged through the hood 2 from the cooking surface, may be maximized to prevent air pollution in the kitchen and to prevent the oil mist from being attached to the wall around the cooking device, kitchen furniture and cooking utensils, thereby keeping the kitchen clean.

In embodiments, for example, the air from the outside of the main body enters the air shield generator at one of the lateral sides of the main body, the second duct guides the air from the first duct, to the other of the lateral sides of the main body, and the air discharge nozzle discharges the guided air from the air shield generator, at the other of the lateral sides, to define the air shield at the other of the lateral sides. That is, a main body includes an upper side and a lower side which is opposite to the upper side, a heating surface (e.g., the cooking plate 31 or the cooking surface) is at the upper side of the main body, the heating surface having a plurality of sides including a front side, a rear side opposite to the front side, and lateral sides opposing each other and each connecting the front side to the rear side, and an air shield generator draws air from outside the main body, at the lower side of the main body and at one side among the plurality of sides, and provides the air as an air shield which is at the upper side of the main body, adjacent to the cooking surface at a side among the plurality of sides which is different from the one side, and flowing in a direction away from the cooking surface.

Accordingly, it is not necessary to increase the operation speed of a discharge device provided in the hood 2 in order to increase the discharge amount of contaminants through the hood 2, thereby significantly reducing exhaust noise.

In addition, according to the disclosure, by cooling an electric part (e.g., a printed circuit board) disposed inside the induction device 30 by using air supplied for forming an air shield, deterioration due to heat emitted from the cooking device 1 during cooking may be prevented.

While embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

INDUSTRIAL APPLICABILITY

The disclosure relates to a cooking device.

What is claimed is:

1. A cooking device comprising:
    a main body including an upper side and a lower side opposing each other, a front side and a rear side opposing each other, and lateral sides opposing each other and each connecting the front side to the rear side;
    a cooking surface at the upper side of the main body; and
    an air shield generator which provides an air shield which is at the upper side of the main body, adjacent to the cooking surface and flowing in a direction away from the cooking surface, the air shield generator comprising:
        an airflow generator which generates an airflow;
        an air discharge nozzle through which air is discharged from the air shield generator to define the air shield; and
        a duct which is connected to the airflow generator and to the air discharge nozzle and into which the air from the outside of the main body enters the air shield generator,
    wherein the duct is at the upper side of the main body, and extends under the cooking surface from one lateral side to the other lateral side among the lateral sides opposing each other.

2. The cooking device of claim 1, wherein
    the duct of the air shield generator comprises:
        a first duct which is connected to the airflow generator and into which the air from the outside of the main body enters the air shield generator, the first duct extending from the lower side to the upper side of the main body to guide the air; and
        a second duct which is at the upper side of the main body, connects the first duct to the air discharge nozzle and is connected to the airflow generator, the second duct extending under the cooking surface from the one lateral side to the other lateral side.

3. The cooking device of claim 2, wherein
    the lateral sides face each other along a horizontal direction; and
    at a same lateral side among the lateral sides:
        the air discharge nozzle includes an inlet through which the guided air from the second duct enters the air discharge nozzle;
        the second duct includes an outlet through which the guided air exits from the second duct; and
        the inlet of the air discharge nozzle is spaced apart from the outlet of the second duct, along the horizontal direction.

4. The cooking device of claim 3, wherein
    the upper side and the lower side of the main body oppose each other along a height direction, and
    the inlet of the air discharge nozzle is closer to the cooking surface than the outlet of the second duct.

5. The cooking device of claim 3, wherein
    the upper side and the lower side of the main body oppose each other along a height direction,
    the air discharge nozzle further includes a pair of guide portions which face each other along the horizontal direction and define the inlet therebetween, one guide portion being further from the outlet of the second duct than the other guide portion,
    each of the pair of guide portions has a lower end which is furthest from the cooking surface, the lower ends of the pair of guide portions being at different distances from the cooking surface, and
    the lower end of the one guide portion which is further from the outlet of the second duct than the other guide portion, is further from the cooking surface than the outlet of the second duct, along the height direction.

6. The cooking device of claim 3, further comprising:
    a waste collector which is connected to the air discharge nozzle at an upper side of the waste collector, and connected to the outlet of the second duct at a lateral side of the waste collector.

7. The cooking device of claim 2, wherein a width of the second duct increases as a distance to the air discharge nozzle decreases.

8. The cooking device of claim 2, wherein
    the air discharge nozzle includes a plurality of discharge ports through which the guided air from the second duct is discharged from the air shield generator to define the air shield, and
    the plurality of discharge ports are arranged in a direction from the front side to the rear side of the main body.

9. The cooking device of claim 2, wherein within the air shield generator, the airflow generator is between the first duct and the second duct.

10. The cooking device of claim 2, wherein
    the first duct includes a lower portion corresponding to the lower side of the main body, and
    the airflow generator is disposed at the lower portion of the first duct.

11. The cooking device of claim 2, wherein
    the main body includes a side panel extended in a direction from the upper side to the lower side, at the one lateral side among the lateral sides, and
    the first duct is extended along an inner side of the side panel of the main body.

12. The cooking device of claim 2, further comprising:
    a printed circuit board which is connected to and adjacent to the cooking surface, and
    a heat dissipation member which is on the printed circuit board,
    wherein the second duct of the air shield generator crosses the heat dissipation member.

13. The cooking device of claim 2, wherein
    the air from the outside of the main body enters the air shield generator at the one lateral side;
    the second duct guides the air from the first duct, to the other lateral side; and the air discharge nozzle discharges the guided air from the air shield generator, at the other lateral side, to define the air shield at the other lateral side.

14. The cooking device of claim 1, wherein
the main body further includes a plurality of sides including the front side, the rear side and the lateral sides, and
the air shield generator is provided in plural including a plurality of air shield generators which respectively provide the air shield at two sides among the plurality of sides.

15. The cooking device of claim 14, wherein the plurality of air shield generators respectively provide the air shield at the front side and at a lateral side among the lateral sides.

16. The cooking device of claim 15, wherein within the main body, the air shield generator at the front side of the main body is connected to the air shield generator at the lateral side.

17. The cooking device of claim 1, wherein the main body further includes:
a cooking chamber, and
a door which opens or closes the cooking chamber.

18. The cooking device of claim 1, wherein the cooking surface is heated by electromagnetic induction or electrical resistance.

19. A cooking device comprising:
a main body including an upper side and a lower side which is opposite to the upper side;
a heating surface at the upper side of the main body, the heating surface having a plurality of sides including a front side, a rear side opposite to the front side, and lateral sides opposing each other and each connecting the front side to the rear side; and
an air shield generator which draws air from outside the main body, at the lower side of the main body and at one side among the plurality of sides, transfers the air under the heating surface and from the one side to an opposite side opposing the one side among the plurality of sides, and provides the air as an air shield which is at the upper side of the main body, adjacent to the heating surface at the opposite side, and flowing in a direction away from the heating surface.

20. The cooking device of claim 19, further comprising:
an electrical component which is connected to and adjacent to the heating surface, and
a heat dissipation member which is on the electrical component,
wherein within the main body, the air shield generator covers the heat dissipation member.

* * * * *